July 8, 1924.
A. W. STATLER
BRAKE BAND LINING
Filed Jan. 18, 1922
1,500,212
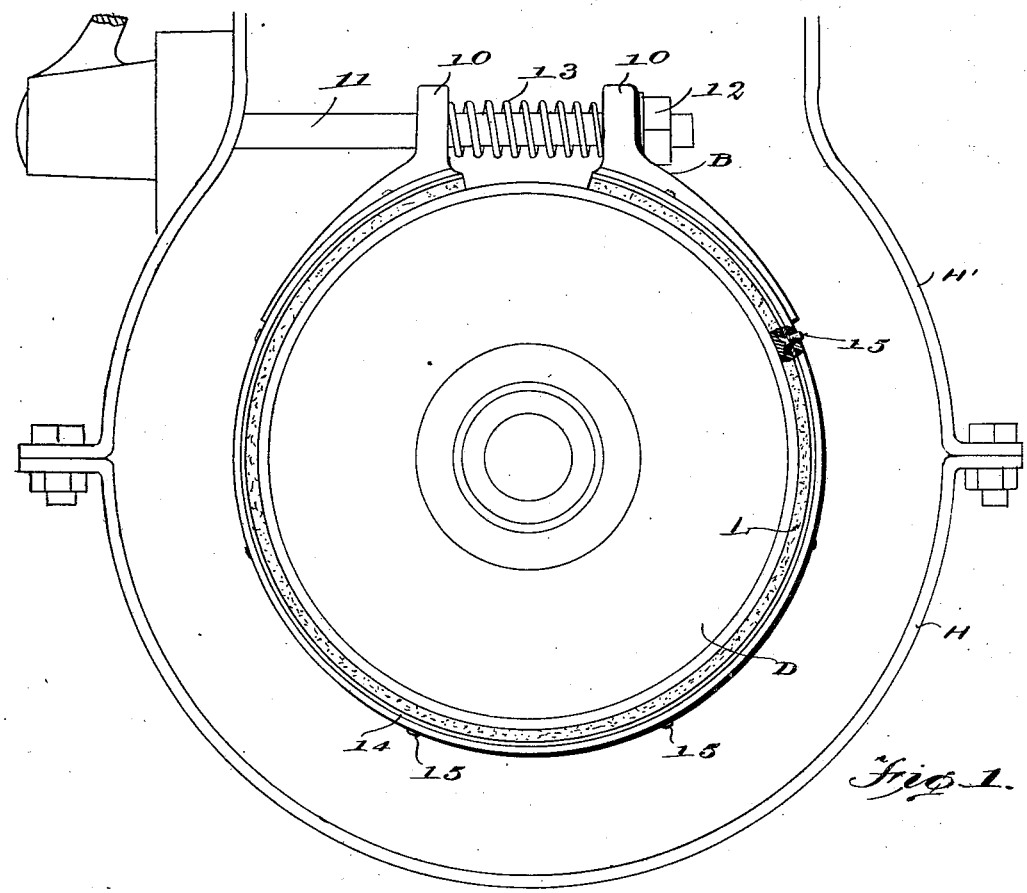
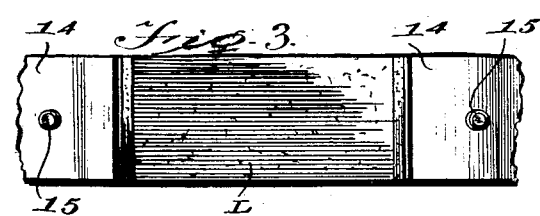
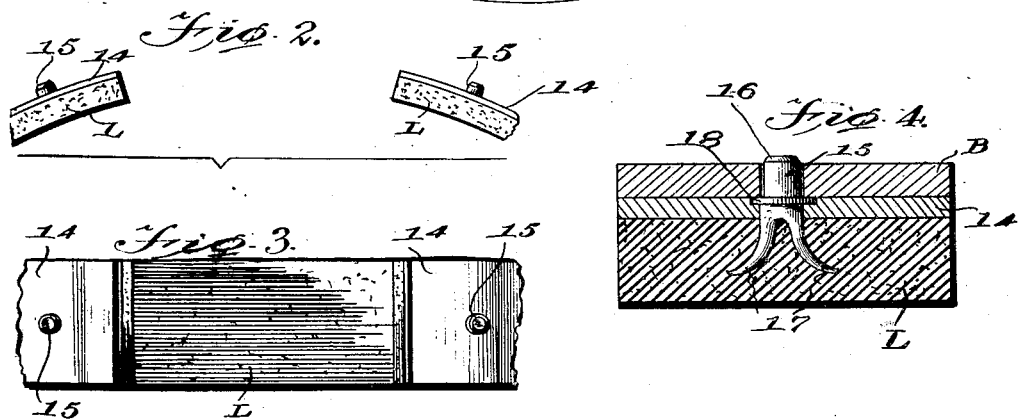
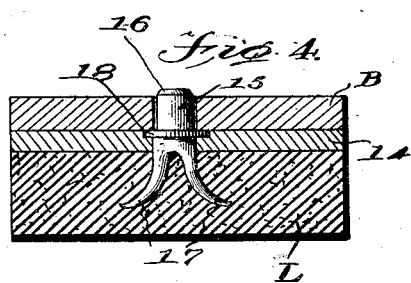
WITNESSES
Lawrence O. Hansen
INVENTOR
A. W. Statler,
BY Munn & Co.
ATTORNEYS Patented July 8, 1924.

1,500,212

UNITED STATES PATENT OFFICE.

ARTHUR WILLARD STATLER, OF DENVER, COLORADO.

BRAKE-BAND LINING.

Application filed January 18, 1922. Serial No. 530,042.

*To all whom it may concern:*

Be it known that I, ARTHUR W. STATLER, a citizen of the United States, and a resident of Denver, in the county of Denver and State of Colorado, have invented certain new and useful Improvements in Brake-Band Linings, of which the following is a specification.

This invention relates to brake band lining. The object of the invention is to provide a lining for brake bands which may be detachably connected to the brake band with the purpose of making it extremely easy to reline a brake band while substantially in its normal or assembled position.

It is also an object of the invention that the detachable lining be adapted to form a positive and rigid connection with the associated brake band for rigidly holding the lining against movement with respect to the brake band.

Other objects and objects relating to details of construction, combination and arrangements of parts will hereinafter appear in the detailed description to follow.

The invention is illustrated by way of example in the accompanying drawings, in which:—

Figure 1 is a diagrammatic transverse section of a transmission gear casing and of the type in which brake bands are employed for changing speed or braking and illustrating a brake band having the invention applied, Figure 2 is a fragmentary side elevation showing the end portions of a brake band lining constructed in accordance with the present invention, Figure 3 is a top plan view of the same, Figure 4 is a transverse sectional view of the same.

Referring to the drawings more particularly, H indicates the lower section of a transmission housing, H' the upper section, B a brake band and D the drum about which the brake band extends. The brake band B is formed at its divided ends with the usual eyes as at 10 through which the brake pedal shaft 11 extends, said shaft carrying the usual adjusting nut 12 and also encircled by the usual spring 13 which is positioned between the divided ends of the brake band B. The shaft 11 is operated by the means of a foot pedal in a manner well understood.

As is obvious with a brake band of this character in order to remove the lining therefrom, it is necessary to entirely remove the brake band from the transmission housing and then strip the same of its lining and remove said lining. This is the usual practise when relining a brake band. The present invention contemplates the provision of a brake band lining which will enable a person to reline the brake band B when within the transmission housing.

In carrying out the invention, I use a brake band lining as generally indicated at L in Figure 1 which is made of the usual friction and pliable material best adapted for this purpose, and I cover the one side thereof with a strip of thin and flexible steel or other suitable material as indicated at 14. This steel band should be of the same length as the lining L and of the same width. For securing the steel band 14 to the lining L I provide a number of brads conforming to that shown at 15, Figure 4. These bands in each instance consists in a body portion which is preferably cylindrical in shape, as shown, and its one end is slightly beveled as at 16, while its other end is bifurcated to provide a pair of prongs 17 which are preferably pointed at their ends. Also the body portion of the brad is formed with a collar 18 at a point adjacent the bifurcated end thereof. The steel band 14 is provided with suitable openings adapted to receive the brads 15 and said openings are preferably counter-sunk in order to seat the collars 18 of the brads 15 as illustrated in Figure 4. This collar 18 of each brad serves to hold the body portion thereof projecting from the steel band 14. The prongs 17 are driven into the lining L and in so doing will spread apart as in Figure 4 to secure themselves against removal.

The brake band with which it is intended to associate the lining L should be provided with series of openings adapted to register with the brads 15 carried by the lining as illustrated in Figure 1.

In relining a brake band, should the same be positioned as shown in Figure 1 of the drawings, then the transmission covering should be removed and the adjusting nut 12 likewise removed to permit the further opening of the brake band B. As is obvious by proper manipulation, the lining L may be removed and a new lining substituted in a short space of time and with little labor. Also in case that this brake band is associated with a wheel or the like the same advantages may be had in positioning or removing the brake lining.

It should also be noted that the body portions of the brads 15 are of sufficient size and so positioned in the brake lining that they will positively hold the lining from movement upon the brake band.

I claim:—

In combination, a brake band, a divided ring removably interfitting the brake band and extending therearound, a strip of friction material upon the inner periphery of the divided ring, a plurality of brads extending through the divided ring transversely thereof, said brads being provided with inwardly extending means engaging the friction material whereby to secure said friction material to the ring, said brads also having outwardly extending means forming band engaging studs projecting beyond the outer periphery of the split ring, and said brake band having openings therethrough to receive the said studs, the studs and brake band openings cooperating to hold the divided ring and friction strip against lateral and longitudinal movement relative to said brake band without necessitating additional means for this purpose.

ARTHUR WILLARD STATLER.